United States Patent
Tanaka

(10) Patent No.: US 10,394,311 B2
(45) Date of Patent: Aug. 27, 2019

(54) APPARATUS AND METHOD FOR INFORMATION PROCESSING

(71) Applicant: Satoshi Tanaka, Tokyo (JP)

(72) Inventor: Satoshi Tanaka, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 97 days.

(21) Appl. No.: 15/481,853

(22) Filed: Apr. 7, 2017

(65) Prior Publication Data

US 2017/0315606 A1 Nov. 2, 2017

(30) Foreign Application Priority Data

May 2, 2016 (JP) .................. 2016-092691

(51) Int. Cl.
*G06F 1/324* (2019.01)
*G06F 1/3293* (2019.01)
(Continued)

(52) U.S. Cl.
CPC ....... *G06F 1/3293* (2013.01); *G03G 15/5004* (2013.01); *G06F 1/12* (2013.01); *G06F 1/324* (2013.01); *G06F 1/3206* (2013.01); *G06F 1/3284* (2013.01); *G06F 1/3287* (2013.01); *G06F 3/1221* (2013.01); *G06F 3/1229* (2013.01); *G06F 9/4418* (2013.01); *G06F 9/461* (2013.01); *G06F 1/3203* (2013.01);
(Continued)

(58) Field of Classification Search
CPC ........ G06F 1/3293; G06F 1/12; G06F 1/3206; G06F 1/324; G06F 1/3284; G06F 1/3287; G06F 3/1221; G06F 3/1229; G06F 9/4418; G06F 9/461; G06F 1/3203; G03G 15/5004
See application file for complete search history.

(56) References Cited

U.S. PATENT DOCUMENTS

| | | | |
|---|---|---|---|
| 2005/0182977 A1* | 8/2005 | Powers | G06F 1/3203 713/300 |
| 2008/0104423 A1* | 5/2008 | Boecker | G06F 1/3203 713/300 |

(Continued)

FOREIGN PATENT DOCUMENTS

| | | |
|---|---|---|
| JP | 2005-267099 | 9/2005 |
| JP | 2009-119617 | 6/2009 |

*Primary Examiner* — Austin Hicks
(74) *Attorney, Agent, or Firm* — Harness, Dickey & Pierce, P.L.C.

(57) ABSTRACT

An information processing apparatus includes a first processor and a second processor. The first processor is operable to perform first processing and second processing in one of a plurality of operating states. The operating states includes a normal state and a power-saving state. The power-saving state is a state in which the first processor consumes less power than the normal state. The second processor is operable to perform the second processing while consuming less power than the first processor does. The second processor detects the first processing that the second processor is not able to perform. The second processor also causes the first processor to transition from the sleep state to the power-saving state to perform the first processing when the first processor is in a sleep state in which a power supply is stopped.

17 Claims, 3 Drawing Sheets

(51) Int. Cl.
    *G03G 15/00*     (2006.01)
    *G06F 1/12*     (2006.01)
    *G06F 1/3206*     (2019.01)
    *G06F 1/3287*     (2019.01)
    *G06F 3/12*     (2006.01)
    *G06F 9/4401*     (2018.01)
    *G06F 9/46*     (2006.01)
    *G06F 1/3234*     (2019.01)
    *G06F 1/3203*     (2019.01)

(52) U.S. Cl.
    CPC .......... *Y02D 10/122* (2018.01); *Y02D 10/159* (2018.01); *Y02D 10/44* (2018.01); *Y02D 50/20* (2018.01)

(56) References Cited

U.S. PATENT DOCUMENTS

| | | | | |
|---|---|---|---|---|
| 2008/0247467 A1* | 10/2008 | Rusanovskyy | .......... | H04N 7/12 375/240.16 |
| 2008/0270753 A1* | 10/2008 | Achiwa | .................. | G06F 9/505 712/30 |
| 2009/0125739 A1 | 5/2009 | Satoh | | |
| 2011/0249291 A1* | 10/2011 | Tsuzuki | ................ | G06F 9/5083 358/1.15 |
| 2012/0144221 A1* | 6/2012 | Naffziger | .............. | G06F 1/3203 713/340 |
| 2014/0101433 A1* | 4/2014 | Tanaka | ................. | G06F 1/3284 713/100 |
| 2014/0325461 A1* | 10/2014 | Moheban | ............. | G06F 17/505 716/104 |

\* cited by examiner

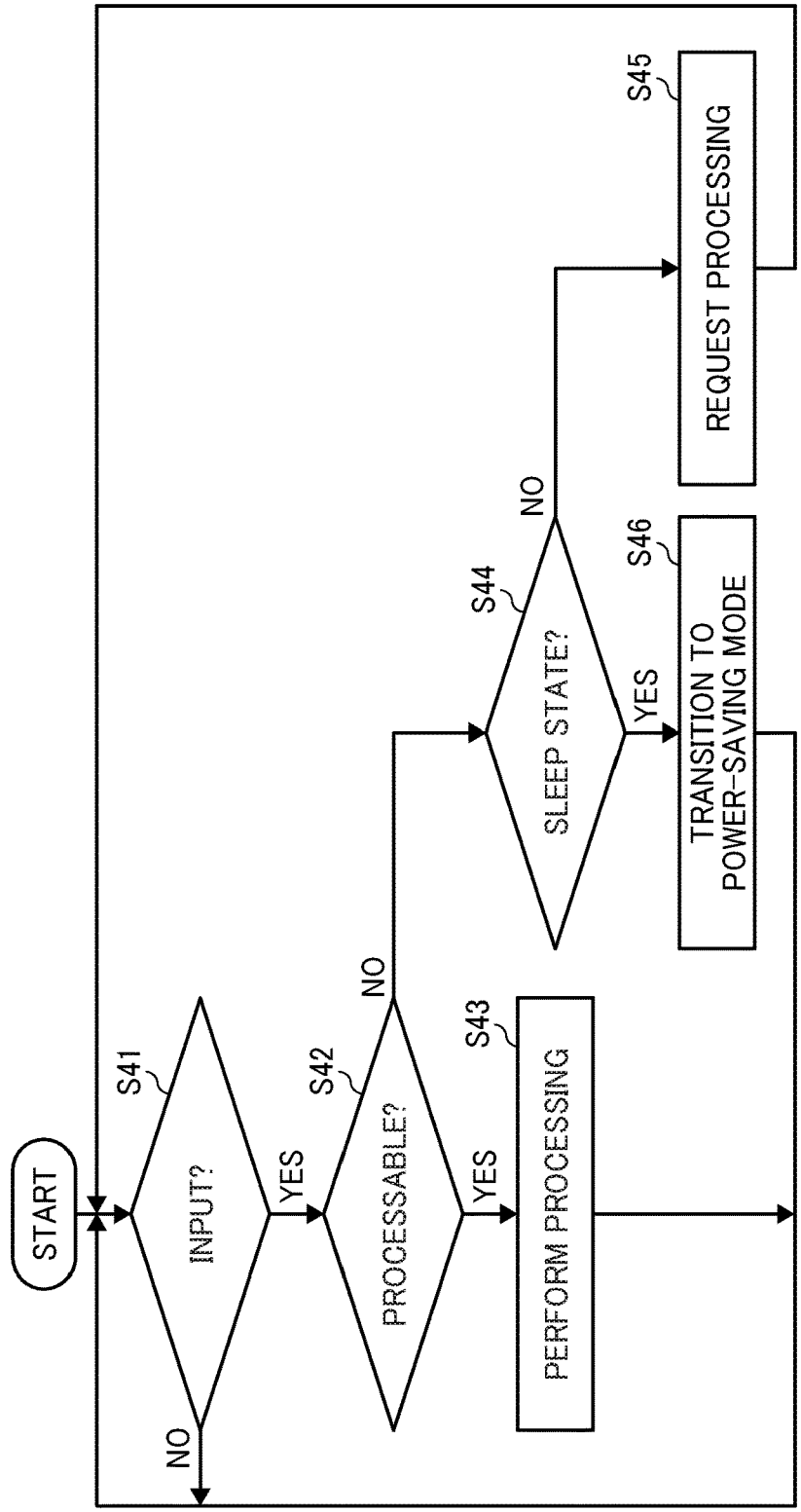

APPARATUS AND METHOD FOR INFORMATION PROCESSING

CROSS-REFERENCE TO RELATED APPLICATION

This patent application is based on and claims priority pursuant to 35 U.S.C, § 119(a) to Japanese Patent Application No. 2016-092691, filed on May 2, 2016, in the Japan Patent Office, the entire disclosure of which is hereby incorporated by reference herein.

BACKGROUND

Technical Field

Embodiments of the present disclosure relate to an information processing apparatus and method.

Related Art

In recent years, processors, such as the central processing units (CPUs) used in information processing apparatuses, consume a large amount of power due to a high integration density. Accordingly, the processors, or the information processing apparatuses generally have a power-saving function.

A power-saving state induced by the power-saving function includes a sleep state, in which power supply to the processor is stopped. To reduce the amount of power consumption, the processors are desirably in the sleep state as long as possible. In view of this, some information processing apparatuses include, in addition to a main processor, a sub-processor that processes some data that can be processed with a comparatively light load relative to other data.

SUMMARY

An information processing apparatus includes a first processor and a second processor. The first processor is operable to perform first processing and second processing in one of a plurality of operating states. The operating states includes a normal state and a power-saving state. The power-saving state is a state in which the first processor consumes less power than the normal state. The second processor is operable to perform the second processing while consuming less power than the first processor does. The second processor detects the first processing that the second processor is not able to perform. The second processor also causes the first processor to transition from the sleep state to the power-saving state to perform the first processing when the first processor is in a sleep state in which a power supply is stopped.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings;

FIG. 4 is a flowchart illustrating an overall process performed by a sub CPU.

DETAILED DESCRIPTION

Figure 1:
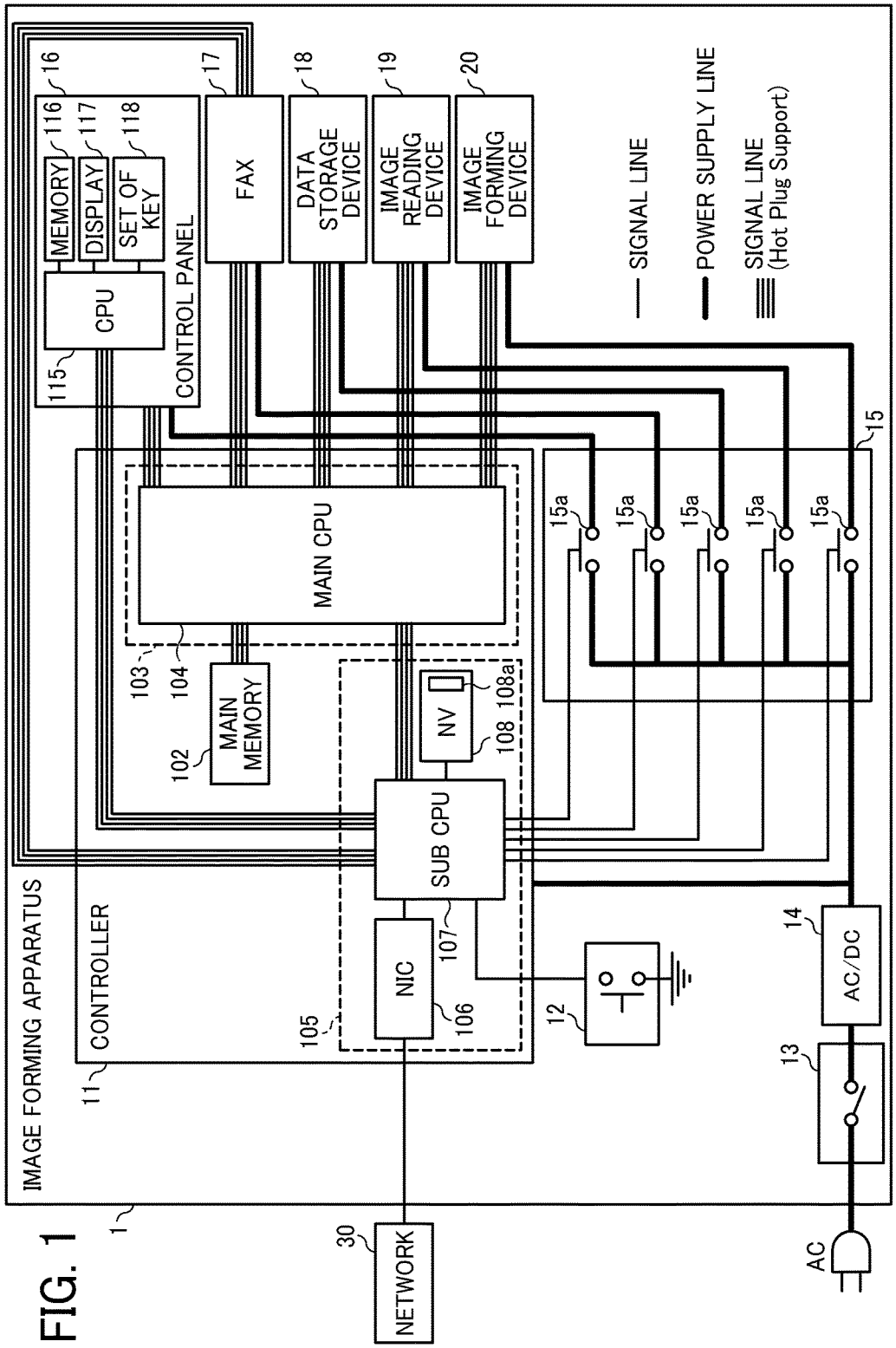
FIG. 1 is a diagram illustrating an example configuration of an image forming apparatus according to an embodiment of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

FIG. 1 is a diagram illustrating an example configuration of an image forming apparatus 1, which is an example of an information processing apparatus, according to an embodiment. The image forming apparatus 1 is a multifunction peripheral (MFP) that can serve as a copier, a printer, a digital reading device/scanner, and a facsimile machine. The image forming apparatus 1 is additionally performs communication via such as a network 30 and processes data obtained through the communication.

As illustrated in FIG. 1, the image forming apparatus 1 includes a controller 11, an eco switch 12, a main power supply switch 13, a power supply unit (PSU) 14, a central power supply switch 15, a control panel 16, a facsimile communication device (fax) 17, a data storage device 18, an image reading device 19, and an image forming device 20.

The controller 11 controls the entire operation of the image forming apparatus 1. The eco switch 12 is an operating device that instructs transition of a power state of the image forming apparatus 1. The eco switch 12 is connected to the controller 11. A user's operation to the eco switch 12 allows the image forming apparatus 1 to transition between a normal state and a power-saving state.

The main power supply switch 13 is an operating device that supplies power provided from an external power supply (e.g. commercial power supply), and stops supplying the power. The PSU 14 is a device that generates alternating current (AC) power and direct current (DC) power to be provided in the image forming apparatus 1, using the power supplied from the external power supply.

The central power supply switch 15 causes the controller 11 to control a power state of each of the components 16 to 20. The central power supply switch 15 includes at least five power supply switches 15a to individually manage the power supply to each of components 16 to 20.

The control panel 16 allows the user to directly input data (including various types of instructions, here) to the image forming apparatus 1. As illustrated in FIG. 1, the control panel 16 includes a central processing unit (CPU) 115, a memory 116, a display 117, and a set of keys 118.

The memory 116 includes, for example, a read only memory (ROM) and a random access memory (RAM). The display 117 includes, for example, a liquid crystal display (LCD) and a touch panel. The set of keys 118 includes, for example, various types of keys and a controller to detect operations associated with the various types of keys.

The CPU 115 controls the entire operation of the control panel 16 by reading a program stored in the ROM to the RAM and executing the read program. By controlling the operation of the control panel 16, the CPU 115, for example, switches display contents to be displayed on the LCD of the display 117, according to a user's operation to operating devices including the various types of keys of the set of keys 118 and the touch panel of the display 117.

The CPU 115 is communicably connected to the controller 11. The CPU 115 sends data, which is input due to the user's operation to the operating device, to the controller 11, if necessary.

With the configuration described above, the central power supply switch 15 supplies power from the PSU 14 to the control panel 16. The control panel 16 transitions to a power-saving mode, namely the power-saving state, when the power supply from the central power supply switch 15 is stopped. In the power-saving state, the CPU 115, for example, transitions from the normal state to a sleep state and stops the power supply to the LCD of the display 117.

The facsimile communication device 17 is a module that performs communication via a telephone line. The facsimile communication device 17 transitions to the power-saving mode to be in, for example, the sleep state when the power supply from the central power supply switch 15 is stopped.

The data storage device 18 is a nonvolatile storage device that is used to store image data to be printed out and the like. The data storage device 18 transitions to the power-saving mode and the power supply to at least a part of the data storage device 18 is stopped when the power supply from the central power supply switch 15 is stopped.

The image reading device 19 includes, for example, an automatic document feeder (ADF), a scanner, and a controller that controls components including the ADF and the scanner. Image data obtained by reading a document with the scanner can be sorted in the data storage device 18. The image reading device 19 transitions to the power-saving mode and the power supply to, for example, the ADF and the scanner is stopped when the power supply from the central power supply switch 15 is stopped. A CPU of the controller transitions to the sleep state.

The image forming device 20 forms an image on a recording medium with such as an electrophotographic method. The image forming device 20 includes a group of electronic components including a plurality of motors, a plurality of solenoids, and a plurality of sensors, a heater, and a control circuit. The image forming device 20 transitions to the power-saving mode, and the components including the heater stop driving, when the power supply from the central power supply switch 15 is stopped.

The controller 11 controls each of the power supply switches 15a of the central power supply switch 15. The controller 11 includes a main memory 102, a main CPU peripheral circuit 103 including a main CPU 104, and a sub CPU peripheral circuit 105 including a sub CPU 107, as illustrated in FIG. 1. The main CPU 104 corresponds to a first processor, and the sub CPU 107 corresponds to a second processor in the embodiment.

The main CPU peripheral circuit 103 includes, for example, a ROM storing firmware and a power supply circuit to supply the power to the main CPU 104. The data storage device 18, described above, stores an operating system (OS), various types of applications/programs, etc. that are executed by the main CPU 104. The main CPU 104 reads the firmware stored in the ROM to the main memory 102, and then reads an application/program, which is to be executed, to the main memory 102 to execute the application/program.

The main CPU 104 is connected to each of the components 16 to 20 by a signal line, as illustrated in FIG. 1. This allows the main CPU 104 to control each of the components 16 to 20 directly after the OS or the application/program is activated.

The sub CPU peripheral circuit 105 includes a network interface controller (NIC) 106 and a non-volatile random access memory (NVRAM) 108, in addition to the sub CPU 107.

The NIC 106 is a communication device that communicates with the network 30. The NIC 106 outputs data received from the network 30 to the sub CPU 107, and sends data received from the sub CPU 107 to the network 30 according to an instruction of the sub CPU 107.

The NVRAM 108 is a non-volatile memory that stores various types of programs executed by the sub CPU 107 and various types of data. The sub CPU 107 sends and receives data via the NIC 106 by executing the program read from the NVRAM 108.

The sub CPU 107 is connected to each of the eco switch 12, the central power supply switch 15, the main CPU 104, the control panel 16, and the facsimile communication device 17, in addition to the NIC 106. The sub CPU 107 monitors the operation to the eco switch 12 performed by the user, and also monitors data output from each of the main CPU 104, the control panel 16, and the facsimile communication device 17.

Data output from each of the eco switch 12, the control panel 16, and the facsimile communication device 17 is actually, for example, an interrupt, or interrupt request. In detecting the operation to the eco switch 12, the sub CPU 107 controls each of the power supply switches 15a of the central power supply switch 15 to be switched between open and closed. As a result of this event, each of components 16 to 20 transitions from the operating mode to the power-saving mode or from the power-saving mode to the operating mode each time the eco switch 12 is operated.

Additionally, when the control panel 16 or the facsimile communication device 17 generates the interrupt, the sub CPU 107 checks whether each power supply switch 15a of the central power supply switch 15 is open or closed. At this time, if determining that the power supply switch 15a is in an open state (off state), the sub CPU 107 switches the state of the power supply switch 15a to a closed state (on state). Through this, the sub CPU 107 can cause each of the components 16 to 20 to transition from the power-saving mode to the operating mode, in response to the interrupt generated by the control panel 16 or the facsimile communication device 17.

The control panel 16 can generate the interrupt when being operated by the user. The facsimile communication device 17 can generate the interrupt when receiving a call.

The sub CPU 107 sends and receives data to and from the main CPU 104. The sub CPU 107 can process data that requires a relatively low load to be processed from the data received by the NIC 106. The sub CPU 107, accordingly, inputs, or receives, the data that the sub CPU 107 can process from the NIC 106 and processes the data assigned to the sub CPU 107 to process, and then outputs the processed data, which is to be sent, to the NIC 106. That is, the sub CPU 107 outputs to the main CPU 104 data that the sub CPU 107 cannot process from the data received by the NIC 106. The data that the sub CPU 107 cannot process is related to processing requiring a relatively high load. Such processing includes, for example, copying and printing, which are main processing operations performed by the image forming apparatus 1, and this processing is defined as target processing that is targeted for execution by the main CPU 104. On the other hand, the processing that the sub CPU 107 can perform, namely processing requiring a relatively low load includes, for example, checking of presence of devices on the network 30, namely address resolution protocol (ARP) response, and checking of conductive state, and an internet protocol (IP) address of the devices in the network 30. This processing is defined as secondary processing that is not targeted for execution by the main CPU 104.

The embodiment provided with the sub CPU 107, which processes some of the data received by the NIC 106, allows the main CPU 104 to stay in the sleep state for a long time compared to a configuration without the sub CPU 107. The number of types of processing that the sub CPU 107 can perform is small, and a load associated such processing is relatively low. Accordingly, a device that consumes less power than the main CPU 104 consumes, can be used as the sub CPU 107. As described above, the duty ratio of the main CPU 104 is reduced because the main CPU 104 is staying in the sleep state longer, and thus the embodiment can reduce an amount of power consumption as a whole, even though the sub CPU 107 is implemented.

The data that the sub CPU 107 cannot process is processed by the main CPU 104. If the data is to be sent after being processed, the main CPU 104 outputs the data to the sub CPU 107 after processing and instructs the sub CPU 107 to send the data. Then the sub CPU 107 sends the data from the main CPU 104 to the network 30 via the NIC 106.

Accordingly, the interrupts due to the operation to the eco switch, the data received by the NIC 106 and which requires a relatively low load to be processed, namely the data other than the target data, and the instruction from the main CPU 104 are included in the secondary processing that is performed by the sub CPU 107, but not by the main CPU 104.

As described above, each device connected to the network 30 checks an operating state of other devices at a predetermined time. The data that the sub CPU 107 processes, namely the secondary processing that is performed by the sub CPU 107 includes, for example, a response to a message for checking the operating state. It is also possible that the sub CPU 107 sends the message and processes the response to the message. Such processing performed by the sub CPU 107 is also the secondary processing, which is not performed by the main CPU 104.

The main CPU 104 has at least a suspend function and an operating speed adjustment function as the power-saving function. With the suspend function, the main CPU 104 saves a state of processing in a memory, and transitions to a suspend mode, which is the sleep state, in response to to an instruction of the user or an idle state that continues for a certain period. With the operating speed adjustment function, clock frequency is fixed to frequency set in advance, or the clock frequency is dynamically changed according to a CPU usage ratio (weight of a load), thereby reducing the amount of the power consumption.

The main CPU 104 that previously transitions to the sleep state returns to the operating state (operating mode) in response to some of the interrupts but not all of the interrupts. In the configuration as illustrated in FIG. 1, such interrupts that can be factors that awaken the main CPU 104 include ones due to the sub CPU 107 associated with the data transfer of the NIC 106, due to (the CPU 115 of) the control panel 16, due to the call to the facsimile communication device 17, and due to a real time clock (RTC). Here in the description, it is assumed that the interrupts, which can be the factors that awaken the main CPU 104, due to external factors, namely the interrupts except for the interrupt due to the RIC, are involved with the sub CPU 107.

The OS executed by the main CPU 104 supports the power-saving function. The OS is implemented with a plurality of types of adjusters (governors), and the adjusters to be activated can be switched. In the embodiment of the disclosure, the adjusters are used for managing a state transition of the main CPU 104 as described below.

Figure 2:
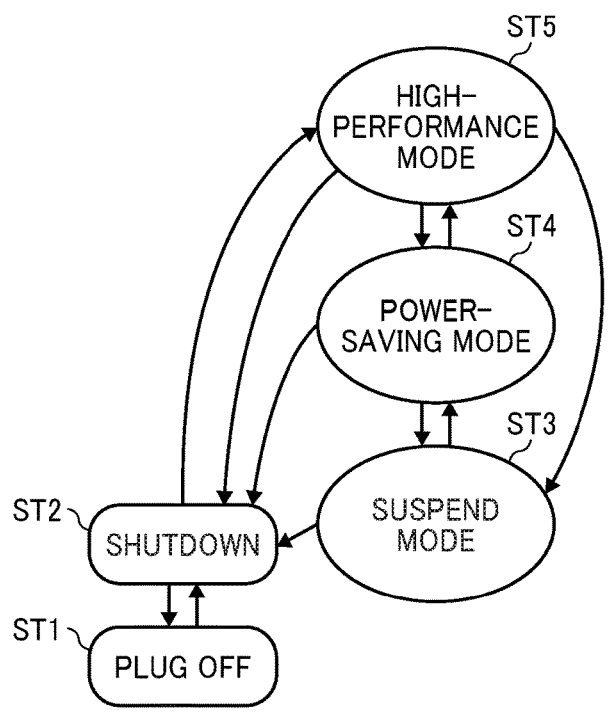
FIG. 2 is an illustration of a state transition of a main central processing unit (CPU) in the embodiment.

FIG. 2 is an illustration of the state transition of the main CPU 104 according to the embodiment. Here, the states of the main CPU 104 after start-up are classified into three states (modes) including a suspend mode ST3, a power-saving mode ST4, and a high performance mode ST5.

The high performance mode ST5 is a mode, which is included in the operating mode, in which the main CPU 104 operates with the highest clock frequency. In the mode ST5, the amount of power consumption of the main CPU 104 is not reduced.

In the suspend mode ST3, the main CPU 104 is in the sleep state and cannot perform processing. The amount of power consumption in the suspend mode ST3 can be reduced to the minimum. The power-saving mode ST4 is a mode, which is included in the operating mode in addition to the high performance mode ST5, in which processing can be performed.

Besides the three states mentioned above, there are a plug off state ST1 and a shutdown state ST2. The plug off state ST1 is a state in which the image forming apparatus is disconnected from the external power supply (e.g. commercial power supply), and the power supply from the external power supply is stopped. The shutdown state ST2 is a state in which the power supply to the image forming apparatus 1 is stopped with the apparatus still plugged in. Transitions between these states are performed under conditions described below.

By connecting the image forming apparatus 1 to the external power supply (e.g., commercial power supply), the main CPU 104 transitions from the plug off state ST1 to the shutdown state ST2. In disconnecting the image forming apparatus 1 in the shutdown state ST2 from the external power supply, the main CPU 104 transitions to the plug off state ST1.

When the user operates with the main power supply switch 13 in the shutdown state ST2, the power supply from the external power supply starts. This causes the main CPU 104 to transition to the high performance mode ST5 to start up. Because a start-up time is desirably short, the main CPU 104 transitions to the high performance mode ST5. In response to an instruction of the shutdown from the user during the high performance mode ST5, the main CPU 104 transitions to the shutdown state ST2.

In the operating mode, the clock frequency is changed dynamically according to a usage rate (the load) of the main CPU 104 in accordance with control of the activated adjuster (OS). Due to this, the transition between the high performance mode ST5 and the power-saving mode ST4 is performed according to the load. Additionally, the main CPU 104 transitions from the operating mode, which is the high performance mode ST5 or the power-saving mode ST4 to the suspend mode ST3, in response to the idle state that continues for a certain period.

In the suspend mode ST3, the user can shut down the image forming apparatus 1. The shutdown is one of several selections, and the state can transition from the suspend mode ST3 to the power-saving mode ST4 with the shutdown.

Return factors for transitioning from the suspend mode ST3 to the power-saving mode ST4 include an interrupt due to external factors such as data reception of the NIC 106 and the interrupt due to the RTC. In the embodiment, a destination of the transition from the suspend mode ST3 to the operating mode due to such return factors is limited to the power-saving mode ST4.

In shortening processing time, the higher the performance is, the more desirable. However, the higher the performance is, the larger the amount of power consumption of the main CPU 104 becomes. To deal with this, the clock frequency to operate the main CPU 104 is required to vary according to the load.

However, it is not always possible to estimate an actual load in processing of the main CPU 104 correctly, because the load depends on, for example, types of the processing or types of data used for the processing. Considering this, in transitioning from the suspend mode ST3 to the high performance mode ST5, the performance may be excessively high. Operating the main CPU 104 with the excessively high performance increases an unnecessary amount of power consumption, even if it is only temporarily. To cope with this, in the embodiment, the main CPU 104 transitions to the power-saving mode ST4 when returning from the suspend mode ST3 to the operating mode.

By transitioning to the power-saving mode ST4, the amount of power consumption can be reduced compared to transitioning to the high performance mode ST5. Even if the load of processing is relatively high for the power-saving mode ST4, the power-saving mode ST4 can transition to the high performance mode ST5, and the processing is dealt with. This transition can be performed in a short time. As described above, the transition from the suspend mode ST3 to the power-saving mode ST4 can appropriately reduce the amount of power consumption according to the actual load.

Figure 3:
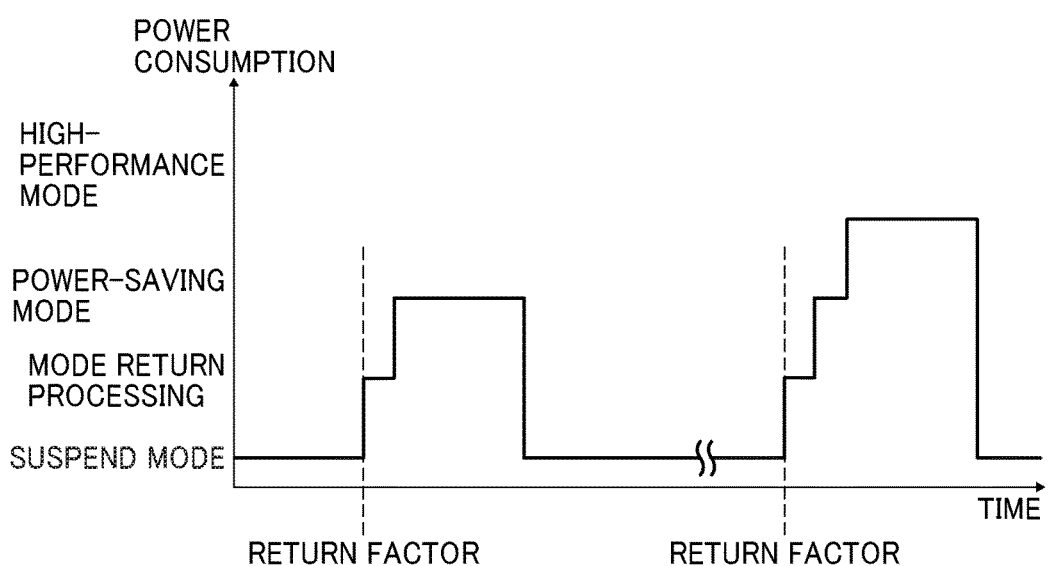
FIG. 3 is a diagram illustrating an example of change in an amount of power consumption of the main CPU over time.

FIG. 3 is a diagram illustrating an example of change in the amount of power consumption of the main CPU over time. In FIG. 3, terms of "suspend mode", "return processing", "power-saving mode", and "high performance mode" are used to present levels of the amount of power consumption. The "suspend mode", the "power-saving mode", and the "high performance mode" represent the levels of amount of power consumption in the suspend mode ST3, the power-saving mode ST4, and the high performance mode ST5, respectively. The "return processing" represents the level of the amount of power consumed in transitioning from the suspend mode ST3 to the power-saving mode ST4.

In the example illustrated in FIG. 3, when the return factor occurs at a first time, the state transitions to the power-saving mode after the returning processing, and then transitions to the suspend mode ST3. On the other hand, in occurring the return factor at a second time, the state transitions to the high performance mode ST5 after the returning processing and the power-saving mode ST4. This indicates that the return factor occurring at the second time is associated with processing requiring a large load that cannot be dealt with in the power-saving mode ST4.

After that, the state transitions from the high performance mode ST5 to the power-saving mode ST4, and then from the power-saving mode ST4 to the suspend mode ST3. This indicates possibility that the load of processing, which is due to the second return factor, becomes smaller by performing the processing, or processing requiring smaller load is performed after the processing, which is due to the second return factor, is completed.

As described in FIG. 3, the main CPU 104 transitions further to the high performance mode ST5 according to the load of processing to be performed even when, or after, transitioning from the suspend mode ST3 to the power-saving mode ST4. Such transition allows the main CPU 104 to operate with appropriate performance according to the load of processing and reduce the amount of power consumption in an appropriate way.

The sub CPU 107 executes a program 108a stored in the NVRAM 108, thereby generating the interrupt that causes the main CPU 104 to return to the power-saving mode ST4. An overall process performed by the sub CPU 107 due to the execution of the program 108a is described in detail with reference to a flowchart of FIG. 4 below.

The sub CPU 107 keeps operating to process data, for example, receiving a message from the NIC 106. The sub CPU 107, accordingly, repeats performing the process of FIG. 4 during the power supply of the image forming apparatus 1 is ON.

The sub CPU 107, which passes control to the program 108a, firstly determines whether there is an input (S41). If there is operation to eco switch 12 or the control panel 16, or data received by the NIC 106, a call received by the facsimile communication device 17, an instruction from the main CPU 104, or the like, such a condition is reported to the sub CPU 107 as the interrupt. On receiving such a notification, the sub CPU 107 determines there is an input, so that the determination of the S41 is YES and the process continues to S42. On the contrary, if there is no notification, the determination of the S41 is NO and the process performs the determination processing of S41 again.

In S42, the sub CPU 107 determines if the sub CPU 107 can process the input. As described above, the operation of the user to the eco switch 12, some of the data (messages) received by the NIC 106, and the instructions from the main CPU 104 (mainly data transfer instruction via the NIC 106) are the secondary processing that the sub CPU 107 can process in alternative to the main CPU 104. The operation to the eco switch 12 or the data, which is to be processed by the sub CPU 107, is input from the NIC 106 or the main CPU 104, the determination of S42 is YES, and the process continues to S43. On the other hand, when the operation to the control panel 16, the call received by the facsimile communication device 17, or the data, which cannot be processed by the sub CPU 107, is received by the NIC 106, the determination of S42 is NO, and the process continues to S44.

In S43, the sub CPU 107 performs the processing associated with the operation to the eco switch 12 or the data input from the NIC 106 or the main CPU 104. According to the processing of the sub CPU 107 in S43, an open/close operation of each of the power supply switches 15a included in the central power supply switch 15, the data transfer using the NIC 106 or the like is performed. After the processing of S43, the process returns to the S41, described above.

In S44, the sub CPU 107 determines if the power supply to the main CPU 104 is stopped (OFF), which means that if the main CPU 104 is in the suspend mode ST3 (sleep state). If the power supply to the main CPU 104 is stopped, the determination of S44 is YES, and the process continues to S46. If the power supply to the main CPU 104 is performed, the determination of S44 is NO, and the process continues to S45.

In S45, the sub CPU 107 requests the main CPU 104 for processing according to content of the input. For example, when the NIC 106 receives the data that the sub CPU 107 cannot deal with, the sub CPU 107 requests the main CPU 104 to process the data by outputting the data to the main CPU 104. After that, the process returns to S41, which is described above.

In S46, the sub CPU 107 performing processing to cause the main CPU 104 to transition to the power-saving mode ST4, by, for example, generating the interrupt. If the data that cannot be processed with the sub CPU 107 is input, the sub CPU 107 requests the main CPU 104 for processing of the data after the transition to the power-saving mode ST4. After that, the process returns to S41, which is described above.

With the power-saving mode ST4 that is transitioned from the suspend mode ST3, the adjuster that has clock frequency lower than the original highest clock frequency is activated. For example, after the transition to the power-saving mode ST4, the sub CPU 107 activates other adjuster that changes the clock frequency according to the load, according to a certain elapsed time, with an upper limitation of the highest clock frequency of the adjuster. As a result, the main CPU 104 can operate along with the transition (mode transition) of the amount of power consumption, as described in FIG. 3. The switching of the other adjuster is performed, for example, due to an output of command processed by the OS.

As described above, the sub CPU 107 executing the program 108a detects processing that is to be performed by the main CPU 104, and also manages the transition of the state of the main CPU 104 from the suspend mode ST3 to the power-saving mode ST4. That is, the sub CPU 107 serves as a detector and a transition controller in the embodiment.

The embodiment is described by applying the disclosure to the image forming apparatus 1, however an applicable information processing apparatus is not limited to the image forming apparatus. The embodiment of the disclosure can be used widely with the information processing apparatus that is implemented with one or more of first processors such as one or more of CPUs (each corresponding to the main CPU 104 in the embodiment), and one or more of second processors (each corresponding to the sub CPU 107 in the embodiment) that consume an amount of power less than the first processors.

The first processor and the second processor may be sealed in the same package. implementing the first processor and the second processor in the same sealed package, namely integrating the first processor and the second processor on a system on chip, can reduce in size and costs because of reduction in the number of components.

With the power-saving mode ST4 that is transitioned from the suspend mode ST3, the highest clock frequency is lower than the original highest clock frequency, however, the power-saving mode ST4 is not limited to (or operates) the clock frequency. When the main CPU 104 is a multi-core CPU that is implemented with a plurality of cores, which execute processing, the power-saving mode ST4 may be a mode in which the number of cores operating the processing may be reduced instead of limiting the clock frequency, or in addition to the limitation of the clock frequency. With the multi core CPU, the number of selections that are ways to reduce the amount of power consumption increase. This can reduce the amount of power consumption appropriately by selecting an appropriate way. The power-saving mode ST4 may be any mode as long as the amount of power consumption is smaller than the high performance mode ST5, in which the amount of the power consumption is the highest.

Additionally, in the description of the embodiment, the sleep state, from which the state transitions to the power-saving mode ST4, corresponds to the suspend mode ST3, however, the sleep state is not limited to the suspend mode ST3. The sleep state in the description is used as a state in which the CPU cannot perform the processing, and also includes a stop mode in which the processing cannot be performed. Considering this, the sleep state may be not only the suspend mode ST3, but also a different mode from the suspend mode ST3. The sleep state may include a plurality of modes, which are selectable.

Although the exemplary embodiments of the disclosure have been described and illustrated above, such description is not intended that the disclosure be limited to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An information processing apparatus to perform processing, comprising:
    an image forming device including a fixing unit;
    a display;
    a data storage;
    a first processor operable to perform first processing and second processing in one of a plurality of operating states, the plurality of operating states including a normal state in which each of the image forming device, display and data storage are operable and a power-saving state in which each of the image forming device, display and data storage are not operable, the power-saving state being a state in which the first processor consumes relatively less power than the normal state; and
    a second processor operable in a sleep state in which no power is supplied to the first processor, to perform the second processing while consuming relatively less power than the first processor consumes, the second processor being unable to perform the first processing and being further configured to:
        detect the processing to be performed by the information processing apparatus as the first processing or the second processing;
        execute detected processing when the detected processing is second processing; and
        cause, upon the first processor being in the sleep state in which a power supply to the first processor is stopped and the second processor is operable and upon the processing detected being processing that cannot be performed by the second processor, the first processor to transition from the sleep state directly to the power-saving state and dynamically adjust a clock frequency according to a load of the processing to be performed, the adjusted clock frequency being lower than a maximum clock frequency of the first processor, to perform the first processing.

2. The information processing apparatus of claim 1, wherein the first processor and the second processor are sealed in a same package.

3. The information processing apparatus of claim 2, wherein the first processor comprises a plurality of cores to perform the first processing and second processing.

4. The information processing apparatus of claim 1, wherein the sleep state is a state in which the first processor is configured to operate with a clock frequency relatively lower than a clock frequency of the normal state.

5. The information processing apparatus of claim 1, wherein the first processing includes processing requiring a relatively higher load of processing, compared to the second processing.

6. The information processing apparatus of claim 1, wherein the second processor is further configured to perform the second processing, upon the processing detected being second processing.

7. The information processing apparatus of claim 1, wherein in the operating mode, the information processing apparatus transitions between the normal and the power-saving mode according to a usage rate of the first processor.

8. A method of processing of information, comprising:
providing a first processor and a second processor, the first processor being operable to perform first processing and second processing in one of a plurality of operating states, the plurality of operating states including a normal state in which each of an image forming device, a display and a data storage are operable and a power-saving state in which each of the image forming device, the display and the data storage are not operable, the power-saving state being a state in which the first processor consumes relatively less power than the normal state, and the second processor being operable in a sleep state in which no power is supplied to the first processor, to perform the second processing while consuming relatively less power than the first processor consumes and being unable to perform the first processing;
detecting processing of information to be performed as the first processing or the second processing;
executing detected processing when the detected processing is second processing; and
controlling, upon the first processor being in the sleep state in which a power supply is stopped and upon the processing of information detected being processing that cannot be performed by the second processor, the first processor to directly transition from the sleep state to the power-saving state and dynamically adjusting a clock frequency according to a load of the processing to be performed, the adjusted clock frequency being lower than a maximum clock frequency of the first processor, to perform the first processing.

9. The method of processing information of claim 8, wherein the first processor comprises a plurality of cores to perform the first processing and second processing.

10. The method of processing information of claim 8, wherein the sleep state is a state in which the first processor is configured to operate with a clock frequency relatively lower than a clock frequency of the normal state.

11. The method of processing information of claim 8, further comprising:
detecting, via the second processor, the processing of information to be performed as the second processing; and
performing, via the second processor, the second processing upon the processing of information detected being second processing.

12. The method of processing information of claim 8, wherein the first processing includes processing requiring a relatively higher load of processing, compared to the second processing.

13. The method of processing information of claim 8, wherein the second processing includes determining an operating state of the first processor.

14. A method of processing, in an information processing apparatus to perform processing including a first processor and a second processor, the second processor being able to perform at least some of the processing while consuming relatively less power than the first processor consumes, the method comprising:
detecting, via the second processor, processing to be performed;
executing detected processing when the detected processing is the second processor is able to perform;
determining, via the second processor, an operating state of the first processor, and
controlling the first processor to transition from a sleep operating state to a first power operating state in which each of an image forming device, a display and a data storage are not operable and from the first power operating state to a second power operating state in which each of the image forming device, the display and the data storage are operable and dynamically adjusting a clock frequency according to a load of the processing to be performed, the adjusted clock frequency being lower than a maximum clock frequency of the first processor, in which the first processor is configured to perform the processing detected, upon the processing detected being processing that the second processor is unable to perform and upon the operating state determined being the sleep state.

15. The method of processing information of claim 14, further comprising:
performing the processing detected, via the second processor, upon the processing detected being processing that the second processor is able to perform.

16. The method of processing information of claim 14, wherein the sleep operating state is a state in which the first processor is configured to operate with a clock frequency relatively lower than a clock frequency of the power operating state.

17. The method of processing information of claim 14, wherein the processing that the second processor is able to perform includes processing requiring a relatively higher load of processing, compared to other processing.

* * * * *